United States Patent [19]

Pierce et al.

[11] Patent Number: 5,318,394
[45] Date of Patent: Jun. 7, 1994

[54] TEMPLATE FOR CONTROLLING OPERATION OF A DRILL ON A CONTOURED WORKPIECE

[75] Inventors: Edward C. Pierce, Swarthmore, Pa.; Arthur E. Watson, Wilmington, Del.

[73] Assignee: The Boeing Company, Seattle, Wash.

[21] Appl. No.: 921,748

[22] Filed: Jul. 30, 1992

[51] Int. Cl.⁵ .............................................. B23B 49/02
[52] U.S. Cl. ............................ 408/72 B; 408/115 B; 408/241 B
[58] Field of Search ............... 408/72 R, 72 B, 115 B, 408/241 B, 706, 115 R; 33/562, 563, 645

[56] References Cited

U.S. PATENT DOCUMENTS 2,417,539  3/1947  Aronson .
3,158,045  11/1964  Siler .
4,108,566  8/1978  Jones ............................... 408/115

FOREIGN PATENT DOCUMENTS 698643  10/1953  United Kingdom ............ 408/72 R

*Primary Examiner*—Steven C. Bishop
*Attorney, Agent, or Firm*—Jones, Tullar & Cooper

[57] ABSTRACT

A tool for locating the positions where holes are to be drilled in a contoured workpiece includes several thin, flexible plates stacked on one another, conforming to the contour of the workpiece, and held together by fasteners. The intermediate plate has holes through its thickness sized to receive the nose bushing of a drilling machine, the holes being spaced along the length of the workpiece. The innermost plate, which contacts the workpiece and the outermost plate, include slotted holes aligned with the holes of the intermediate plate.

16 Claims, 2 Drawing Sheets

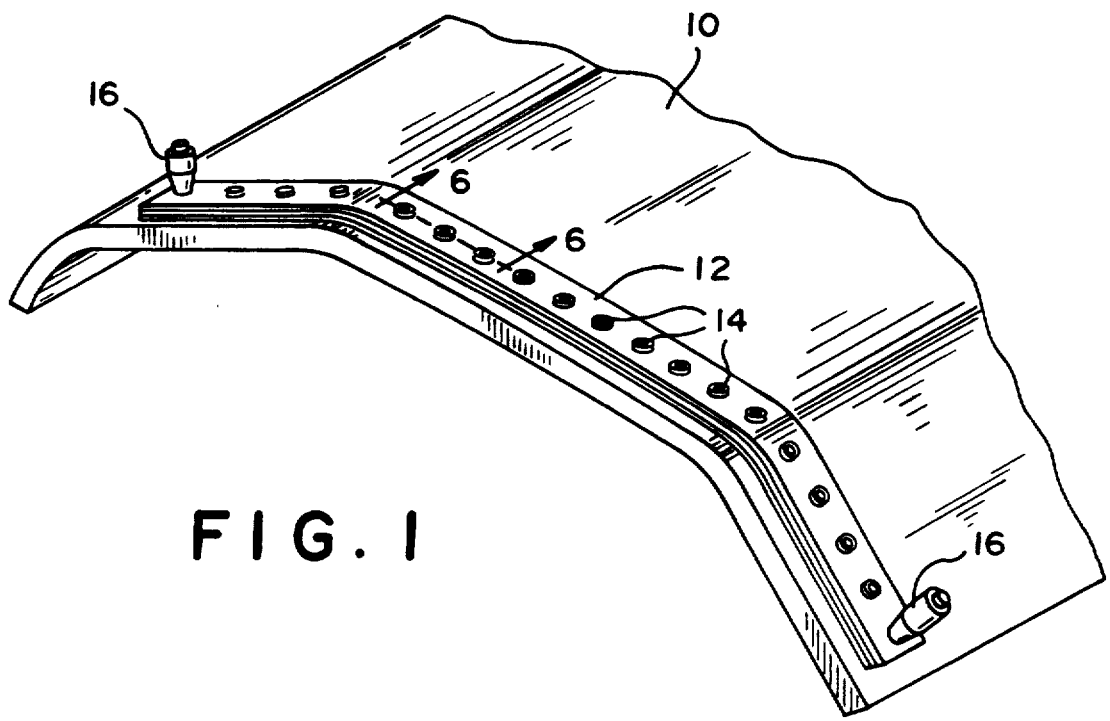
FIG. 1
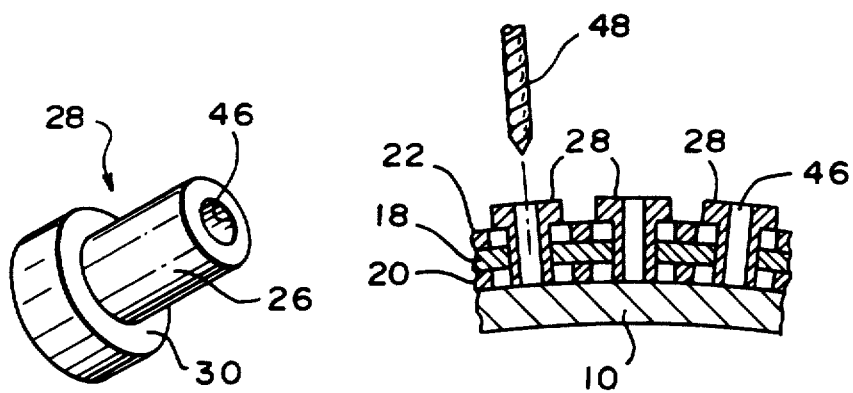
FIG. 5
FIG. 6

TEMPLATE FOR CONTROLLING OPERATION OF A DRILL ON A CONTOURED WORKPIECE

BACKGROUND OF THE INVENTION

1. Field of the Invention

This invention relates to the field of drilling techniques and drilling machinery for making holes in metal components, especially in sheet metal. More particularly, it pertains to drill templates or jigs for locating the proper position of holes to be drilled in a cambered workpiece and controlling a drilling machine or guiding an operator in making the holes.

2. Description of the Prior Art

In conventional practice, before a pattern of holes is drilled in a workpiece preparatory to installing rivets in the holes, a template or jig containing correctly located and directed holes conforming to the desired hole pattern is made and placed on the surface to be drilled. Then a drill, driven rotatably by a suitable motor, is inserted in each hole of the jig and forced against and through the workpiece sufficiently to accept the rivet to be placed in the holes. Often drill guide bushings, of hardened metal highly resistant to wear, are used with the jig to direct and guide the drill as it passes through the jig and into the workpiece.

Drill jigs and templates must have a thickness sufficient to establish accurately the location of the drill point on the workpiece and to direct correctly the drill as it passes through the jig and into the workpiece. When a drill guide bushing is used, the jig thickness must be large enough to grip and hold the bushing without movement throughout the drilling operation.

However, where the workpiece surface is cambered, as in the convexity of the curve of an airfoil from the leading edge to the trailing edge, especially in the vicinity of the leading edge where the airfoil contour changes form rapidly, the material and thickness of a conventional drill jig make the jig too stiff to conform to the surface to be drilled. It is preferred that a drilling template or jig be sufficiently flexible such that when placed on the curved surface of the workpiece it will bend readily, or under moderate pressure, into conformance with the contour to be drilled yet have sufficient thickness to hold a drill guide bushing or otherwise direct a drill and maintain its proper position. Furthermore, once formed to the shape of the workpiece, the drill template or jig should maintain its shape during the drilling operation while fixed rigidly in position on the workpiece.

Various techniques have been devised to drill accurately located and correctly directed holes in curved surfaces used in the fabrication of riveted airplane structures, such as wings and aerodynamic control surfaces.

U.S. Pat. No. 4,108,566 describes a drilling jig containing a hole pattern, the jig being of the conventional rigid type, preformed to the contour of the workpiece surface.

U.S. Pat. No. 3,158,045 describes a method and tools employed to locate apertures in structural components joined together by bolts, screws or rivets. The patent is concerned with replicating accurately in production tooling the dimensions and characteristics originally present in master tooling to which the production tooling is referenced.

A flexible drill jig that employs a soft rubber sheet supporting drill guide bushings is described in U.S. Pat. No. 2,417,539. Rubber or another elastomer is used in order that the sheet will conform to the cambered surface of an airplane wing. The drill guide bushings, held in place between lamina comprising the rubber sheet, are not rigidly supported. Instead, they are subject to longitudinal and rotational displacement from a true reference position and inclination due to the dimensionally unstable nature of the rubber sheet that supports and carries them.

SUMMARY OF THE INVENTION

It is an object of this invention to provide a drill template or jig of sufficient flexibility that it will conform closely to the contour of a surface to be drilled yet maintain the dimensional stability of the hole pattern and directional integrity of the holes. The drill template of this invention has the advantages that it replaces expensive basket templates with a low cost alternative that includes no flexible soft materials, which are susceptible to damage by chemicals present in production areas and rough treatment that may accompany handling of tools in an automated assembly operation.

A flexible drill template, jig or tool adapted to correctly locate and guide a drill in forming holes in a workpiece having a contoured surface includes several thin, flexible plates stacked on one another. One plate contains holes through the thickness of the plate, spaced mutually along the length of the workpiece, and located in a predetermined pattern, each hole corresponding to the locations of holes to be drilled with the aid of the template. The holes are sized to produce a close fit with drill guide bushings that define a central passage along which the drill is guided while forming holes in the workpiece.

An inner plate, which contacts the workpiece and an outer plate, most distant from the workpiece, include holes that are larger than, and aligned with the holes of the intermediate plate so that the drill guide bushings do not contact the surfaces of the holes in the outer and inner plates as the template flexes into conformance with the contour of the workpiece. The holes of the inner and outer plates are preferably slotted holes, the axis of the slots being directed in alignment with the workpiece contour. The drill guide bushing has a head that rests on the outer surface of the outer plate.

The plates also contain attachment holes, which are larger that the diameter of a bolt that passes through them. The oversized nature of the fit between the attachment holes and the bolts that hold the plates together and between the drill bushings and the holes of the inner and outer plates permit the plates comprising the template to bend readily to the shape and contour of the workpiece with little structural bending stiffness. There is effectively no shear connection between the plates except for a light frictional contact among the plates near the attachments resulting from tension produced by drawing up the nut that engages the screw threads of the attachment bolt. The frictional force from this source can be carefully controlled by adjusting the torque applied to the attachment bolts.

BRIEF DESCRIPTION OF THE DRAWINGS

FIG. 1 is a perspective view of a workpiece and the template of this invention located on the workpiece for drilling holes along a line of predetermined hole locations.

FIG. 5 is a perspective view of a drill guide bushing.

FIG. 6 is a partial cross section taken at plane 6—6 of FIG. 1.

DESCRIPTION OF THE PREFERRED EMBODIMENT

Referring first to FIG. 1, a highly contoured workpiece 10, to be joined to another part by rivets, bolts or other mechanical attachments, must have attachment holes (not shown) drilled through the thickness of the workpiece before the parts are assembled and joined by inserting the attachments in the holes. The contour of the outer surface of the workpiece may be positive or convex (as shown), or it may be negative or concave.

A template 12 conforming to the workpiece contour contains holes 14 spaced mutually along the workpiece and located at the position of the holes to be drilled in the workpiece. The template is fixed in position on the workpiece by standard CLECO fasteners 16, conventional spring-loaded, commercially-available devices that temporarily engage the template and workpiece and thereafter release them when the spring force is removed.

The template comprises thin flexible plates stacked on one another, preferably of sheet metal having a thickness that allows them to bend easily and sufficiently to conform to the shape of the workpiece. The length and width of the template can have any suitable dimensions provided they, in combination with the thickness of the plates and the physical properties of the selected material, permit the template to conform to the surface of the workpiece. For example, the surface area of the template can be large enough to contain the entire pattern of attachments for which holes are to be drilled with the aid of the template at a particular location.

Figure 2:
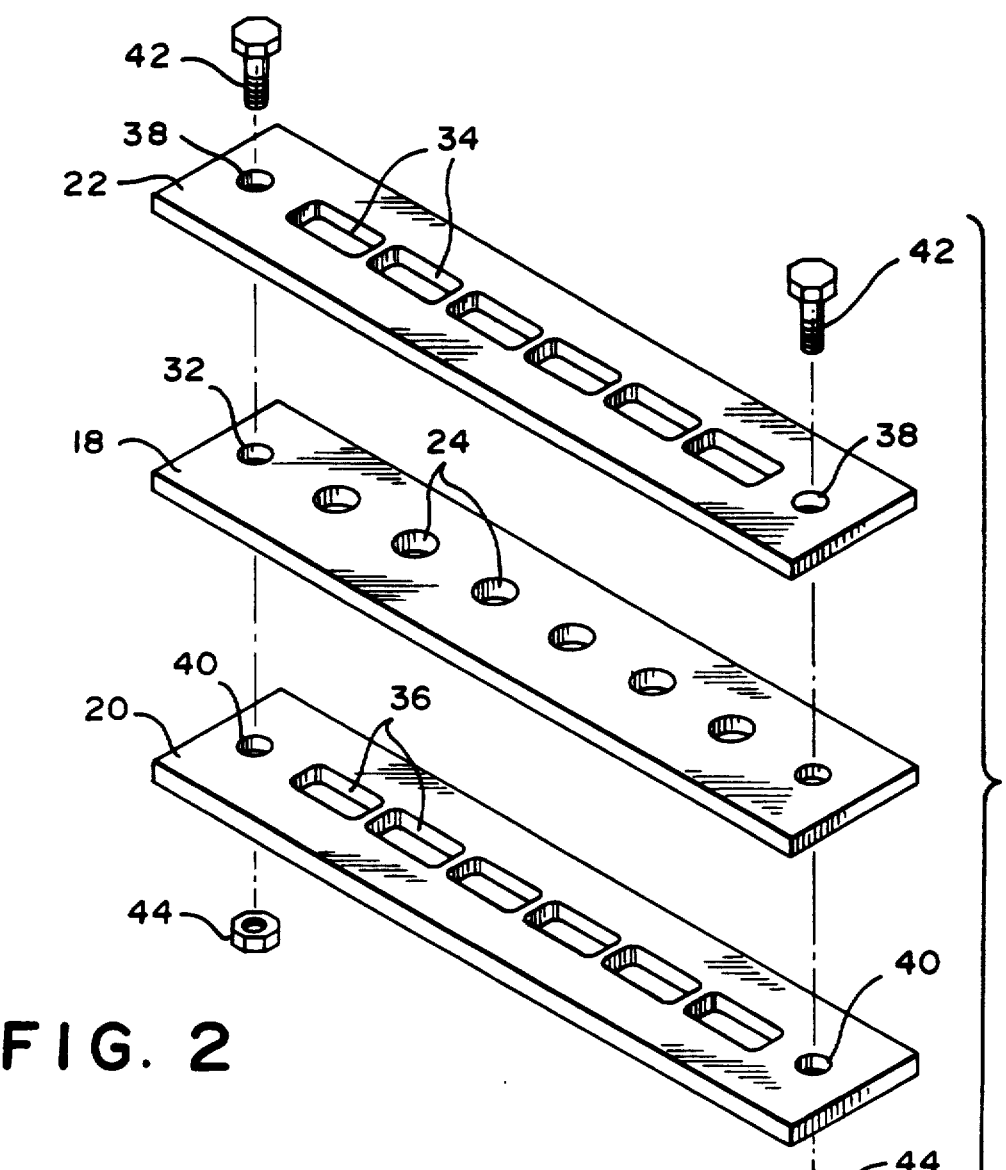
FIG. 2 is an exploded isometric view of the plates that comprise the template of FIG. 1.
Figure 3:
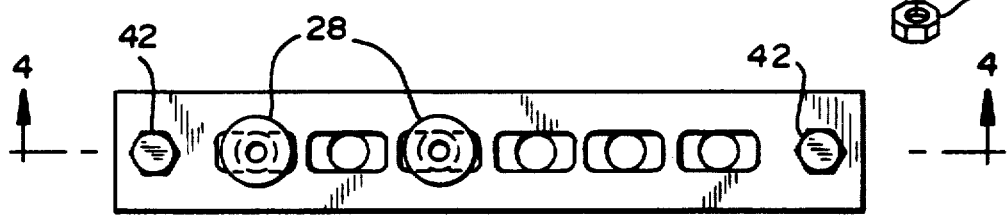
FIG. 3 is a top view of the assembled template of FIG. 2.
Figure 4:
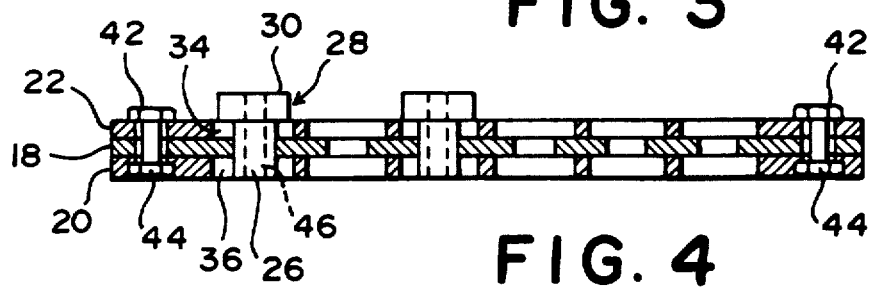
FIG. 4 is a cross sectional view taken at plane 4—4 of FIG. 3 showing a drill bushing located in the holes of the template.

An intermediate plate 18 is located between an inner plate 20, which contacts the outer surface of the workpiece, and an outer plate 22. The intermediate plate 18 is formed with circular holes 24 (FIG. 2) centered at the locations of the holes to be drilled in the workpiece. The diameter of the holes 24 is substantially equal to the diameter of the cylindrical shank 26 of a drill bushing 28 (FIG. 5), which has a head 30 located at one end of the shank. The drill bushing, of hardened metal, includes a central hole 46 in which the drill is located and guided as it passes through the template and workpiece.

Intermediate plate 18 is formed with attachment holes 32, by means of which the plates are joined mutually and fixed in correct relative position. Holes 32 are oversized in relation to the diameter of the attachment bolt 42 so that the shank of bolt 42 does not contact the surface of the attachment holes in the plates. The bolt head contacts the outer surface of plate 22.

The outer plate 22 and the inner plate 20 are substantially identical. Each includes slotted holes 34, 36 centered substantially at the location of the centers of the holes 24 of the intermediate plate and aligned with the hole pattern to be drilled. The width of the slotted holes 34, 36 is approximately equal to the diameter of the holes 24 in the intermediate plate but the length of the slotted holes is greater than the diameter of holes 24.

Plates 20, 22 include attachment holes 38, 40, aligned with attachment holes 32 of the intermediate plate and sized to receive the bolt 42 that extends through the plates. Holes 38, 40 are oversized in relation to the diameter of the attachment bolt 42 so that the shank of bolt 42 does not contact the surface of the attachment holes in the plates but the bolt head contacts the outer surface of plate 22. The lower surface of plate 20 is counterbored or countersunk at the attachment holes 40 so that nut 44, which engages the threads of bolt 42, is located within the thickness of plate 20 and does not extend beyond the lower surface of the template.

The template is assembled by inserting bolts 42 in attachment holes 32, 38, 40 and drawing nuts 44 up on the threads of the bolts. Drill guide bushings are inserted into each hole 24 from the outer surface of the template such that the head 30 rests on the outer surface of plate 22 and the shank extends through plates 18, 20, 22.

The template is then placed over the outer surface of the workpiece, as FIG. 6 shows, forced with light pressure against that surface, and connected to the workpiece by the CLECO fasteners. The plates bend readily into conformance with the surface to be drilled because the bending thickness of the assembled template is low. The template is inherently flexible because the attachment bolts 42 do not contact the surfaces of the holes 32, 38, 40 in which they are located and the drill guide bushings 28 do not contact the surfaces of the slotted holes 34, 36 in which they are located as the template flexes into conformance with the workpiece contour. Holes 34, 36 are slotted in the direction of the workpiece contour, thereby preventing contact between the drill bushings and the outer and inner plates 20, 22.

FIG. 6 shows that the inherent flexibility of the laminated template that allows it to conform closely to the surface of the workpiece also directs the drill guide bushings 28 substantially perpendicular to the workpiece surface. A drill 48 fixed to a pneumatic motor is brought to the top of each drill bushing, inserted into the central passage 46 of the bushing, and guided under force into the workpiece 10. The close fit of the bushings in the holes 24 of the intermediate plate and contact of the bushing head 30 on the outer plate 22 determine the location and direction of the passages 46 in the bushing. In this way, the resulting holes produced in the workpiece are straight and perpendicular to the contoured surface of the workpiece.

The flexible drill template is intended for use on any curved surface but it is particularly useful in drilling holes in an airplane wing or fuselage skin and frame, in which rivets are used to secure the skin in position on the wing or frame.

Although this invention is described with reference to the riveted assembly of sheet and plate components of the type used in the airplane and missile industries, the invention is applicable also to other structural elements and fabrication techniques employed in other industries.

We claim:

1. A template for controlling operation of a drill on a workpiece, comprising:
   a plate assembly of several plates stacked one on another, having aligned holes formed through the thicknesses of the plates;
   a drill guide bushing located in at least one of the holes of the plate assembly, said drill guide bushing closely fitting a hole of a first plate and loosely fitting a hole of a second plate; and means for connecting together the plates of the plate assembly.

2. The template of claim 1 wherein the first and second plates further comprise aligned attachment holes, and wherein the connecting means comprises attachments located in the attachment holes and loosely fitting the attachment holes.

3. The template of claim 1 wherein the drill guide bushing includes a shank portion extending through the thicknesses of the first and second plates and a head portion resting on a surface of the second plate.

4. The template of claim 1 wherein:
the drill guide bushing includes a shank portion extending through the thicknesses of the first and second plates and a head portion resting on a surface of the second plate;
the first and second plates further comprise aligned attachment holes; and
the connecting means comprises attachments located in the attachment holes and loosely fitting the attachment holes.

5. The template of claim 1 further comprising means for temporarily connecting the template to the workpiece and releasing said workpiece connection.

6. A template for controlling operation of a drill on a workpiece, comprising:
a plate assembly of first, second and third plates stacked one on another, having aligned holes formed through the thicknesses of the plates;
a drill guide bushing located in at least one hole of the plate assembly, said drill guide bushing closely fitting a hole of said first plate and loosely fitting the corresponding hole of said second plate and said third plate; and
means for connecting together the plates of the plate assembly.

7. The template of claim 6 wherein the plates further comprise aligned attachment holes, and wherein the connecting means comprises attachments located in the attachment holes and loosely fitting the attachment holes.

8. The template of claim 6 wherein the drill guide bushing includes a shank portion extending through the thicknesses of the first, second and third plates and a head portion resting on a surface of the second plate.

9. The template of claim 6 wherein:
the drill guide bushing includes a shank portion extending through the thicknesses of the first, second and third plates and a head portion resting on a surface of the second plate;
the plates further comprise aligned attachment holes; and
the connecting means comprises attachments located in the attachment holes and loosely fitting the attachment holes.

10. The template of claim 6 further comprising means for temporarily connecting the template to the workpiece and releasing said workpiece connection.

11. A template conforming to the shape of a contoured workpiece for controlling operation of a drill on the workpiece comprising:
a plate assembly of first and second stacked plates, having aligned holes formed through the thicknesses of the plates, the holes of the second plate being slotted, the slots extending along the workpiece contour;
a drill guide bushing located in at least one hole of the plate assembly, said drill guide bushing closely fitting a hole of said first plate and loosely fitting a corresponding hole of said second plate; and
means for connecting together the plates of the plate assembly.

12. The template of claim 11 wherein the first and second plates have aligned attachment holes, and wherein the connecting means comprises attachments located in the attachment holes and loosely fitting the attachment holes.

13. The template of claim 11 wherein the drill guide bushing includes a cylindrical shank portion extending through the thicknesses of the first and second plates and a head portion resting on a surface of the second plate.

14. The template of claim 11 wherein:
the drill guide bushing include a cylindrical shank portion extending through the thicknesses of the first and second plates and a head portion resting on a surface of the second plate;
the first and second layers further comprise aligned attachment holes; and
the connecting means comprises attachments located in the attachment holes and loosely fitting the attachment holes.

15. The template of claim 11 the assembly further comprises:
a third plate located on the opposite side of the first plate from the location of the second plate, having holes formed through its thickness and aligned with the holes of the first and second plates, the holes of the third plate being slotted, the slots extending along the workpiece contour.

16. The template of claim 15 wherein the drill guide bushing includes a cylindrical shank portion extending through the thicknesses of the first, second and third plates and a head portion resting on a surface of the second plate.

* * * * *